United States Patent [19]

Schmeichel et al.

[11] Patent Number: 4,580,657

[45] Date of Patent: Apr. 8, 1986

[54] INTEGRAL FLUTED TUBE FOR SOUND SUPPRESSION AND EXHAUST EJECTION

[75] Inventors: Steven D. Schmeichel, Inger Grove Heights; Wayne M. Wagner, Rosemont; John S. Wiese; Bruce B. Hoppenstedt, both of Bloomington; Joanne E. Kleinhenz, Minneapolis; David L. Roberts, Brooklyn Park, all of Minn.

[73] Assignee: Donaldson Company, Inc., Minneapolis, Minn.

[21] Appl. No.: 505,424

[22] Filed: Jun. 16, 1983

[51] Int. Cl.$^4$ .............................................. F01N 1/00
[52] U.S. Cl. .................. 181/255; 181/252; 181/259; 181/272; 181/273
[58] Field of Search ............ 181/227, 228, 231, 239, 181/247–252, 256, 258, 211, 259, 272, 273; 138/44; 60/320, 322

[56] References Cited

U.S. PATENT DOCUMENTS

| | | |
|---|---|---|
| 910,192 | 1/1909 | Grouvelle et al. . |
| 1,342,340 | 6/1920 | Martin . |
| 1,835,053 | 12/1931 | Huby . |
| 1,934,462 | 11/1933 | Hartsock .................. 181/248 |
| 2,233,327 | 2/1941 | Sauer . |
| 2,391,863 | 1/1946 | Bowen . |
| 2,858,853 | 11/1958 | Lyon .................. 181/228 X |
| 2,926,743 | 3/1960 | Melchior .................. 181/251 |
| 3,043,097 | 7/1962 | Inman et al. . |
| 3,104,736 | 9/1963 | Ludlow et al. . |
| 3,419,892 | 12/1968 | Wagner et al. .................. 181/259 X |
| 3,672,464 | 6/1972 | Rowley et al. .................. 181/253 |
| 3,702,144 | 11/1972 | Loveland . |
| 3,857,458 | 12/1974 | Ohtani et al. . |
| 4,113,051 | 9/1978 | Moller .................. 181/231 |
| 4,142,606 | 3/1979 | Vanderzanden et al. .......... 181/231 |
| 4,147,230 | 4/1979 | Ormond et al. .................. 181/231 |
| 4,241,805 | 12/1980 | Chance, Jr. .................. 181/258 X |
| 4,267,899 | 5/1981 | Wagner et al. .................. 181/272 |
| 4,298,088 | 11/1981 | Keller .................. 181/211 |
| 4,325,460 | 4/1982 | Hoppenstedt .................. 181/259 |

FOREIGN PATENT DOCUMENTS

561067 9/1932 Fed. Rep. of Germany .
172450 8/1960 Sweden .

Primary Examiner—Benjamin R. Fuller
Attorney, Agent, or Firm—Merchant, Gould, Smith, Edell, Welter & Schmidt

[57] ABSTRACT

An integral formed fluted tube intended, for example, for use as a sound suppression device in mufflers, exhaust ejectors, etc. is disclosed. The tube is formed of a cylindrical portion with generally circular inlets and outlets and a constricted portion between those ends and within the constriction, a plurality of bypasses therethrough. The constriction may also include a frontal portion having a generally concave surface which rises to an apex and thereafter forms a plurality of convex rear portions toward the outlet end. Other embodiments are shown in the Figures. The device may be used integrally within a muffler to obtain a venturi effect for an exhaust ejector and sound suppressor.

25 Claims, 28 Drawing Figures

INTEGRAL FLUTED TUBE FOR SOUND SUPPRESSION AND EXHAUST EJECTION

TECHNICAL FIELD

The present invention relates to a tube structure which may be used as part of a device for sound suppression, such as mufflers, or for exhaust ejectors or both simultaneously.

BACKGROUND OF THE INVENTION

Numerous types of sound suppression or attenuation devices are known in the art which, to a greater or lesser degree, accomplish the function of silencing the device to which they are attached. Although great advances have been made in this field, often the advance is offset by an increase in size of the device or in complexity, thus resulting in increased manufacturing costs. The cost problem is exacerbated because, in many such devices, the size of the components then must be precisely selected so that the device is "tuned" to its particular application. Thus, certain components of a muffler must be completely retooled to meet requirements of different engine applications.

A highly effective sound suppression apparatus employing a venturi is shown in U.S. Pat. No. 3,672,464, for a straight-through flow design and for an alternate construction, U.S. Pat. No. 4,267,899. This apparatus was further improved by the use of dual venturis in U.S. Pat. No. 4,368,799. While highly successful devices, these mufflers involved high production costs, as well as expensive tooling for necessary sizes.

It would be desirable to produce a venturi-like sound attenuating device, such as a sonic choke, which has good suppression characteristics but could be inexpensively manufactured in a variety of sizes without expensive retooling. Furthermore, it would also be desirable to achieve those same suppression characteristics in the same or smaller overall package without significant increase in backpressure.

A closely related use of venturis is in exhaust ejectors. Many engine air cleaners are typically designed so that particulate matter separated out may be continuously removed or scavenged through a source of negative pressure connected to the air cleaner, and it is known that a suitable negative pressure for this purpose can be obtained by inserting a venturi into an engine exhaust pipe and a scavenge tube into the venturi. The venturi and scavenge tube thus form an ejector which may or may not be combined with a muffler. Such an ejector arrangement is shown in U.S. Pat. No. 3,137,553, to Billey. It is also known to combine the functions of muffling and ejection into a single unit, such as is shown in U.S. Pat. No. 3,419,892 issued to Wagner et al. In the Wagner et al. disclosure, there is employed a circular venturi which has excellent backpressure and scavenge performance, but because it must be manufactured from spun or die formed parts, such a design is quite expensive to manufacture. Furthermore, even slight changes in size of the venturi require manufacture of completely new dies, making multiple sized units very expensive.

In addition, in some applications, an offset venturi is required in order to meet the space limitations. Such a venturi is shown in U.S. Pat. No. 4,325,460, issued to Hoppenstedt. This device suffers from somewhat poorer performance then the circular venturi, and requires substantially more length to produce the necessary velocity head recovery. If the backpressure and vacuum characteristics of the prior circular venturis can be maintained while reducing the cost of manufacture and perhaps the size of the device, a substantial improvement in the art would be achieved. The present invention provides such an apparatus which meets or exceeds the prior art characteristics for sound suppression and particulate ejection while providing substantial reduction in cost and, in some cases, overall dimensions of the package.

SUMMARY OF THE INVENTION

The present invention is directed to a tube having inlet and outlet ends, comprising a constricted portion between its ends and bypass passages through the constricted portion, within the tube, to permit a portion of the gas flow therethrough to bypass the constriction.

According to another aspect of the invention, the constricted portion is circumferentially discontinuous and wherein the passages are located between those discontinuities.

According to a further aspect of the invention, the constricted portion has a cross-sectional area which decreases to a minimum area and then increases more gradually to a maximum area toward the outlet end of the tube.

The aforementioned tube may be employed as a sound suppression device, an exhaust ejector (or related devices), or both, in the same or separate housings.

The specificiations and drawings disclose numerous embodiments. However, the invention is characterized in the claims annexed hereto and forming a part hereof. For a better understanding of the invention, its advantages and objects attained by its use, reference should be had to the drawings and accompanying descriptive matter.

DETAILED DESCRIPTION OF THE INVENTION

For purposes of clarity, the application of the invention to sound suppressors and ejectors is discussed separately hereafter.

Figure 1:
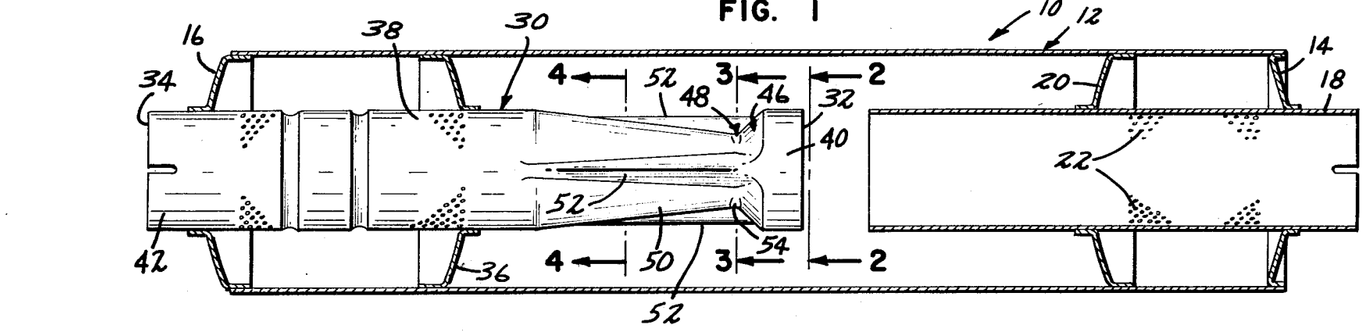
FIG. 1 is an axial sectional view of a preferred embodiment of a muffler according to the invention.

To aid in the understanding of the present invention as used in sound suppression, FIG. 1 shows an overall view of a muffler incorporating the present invention. It should be understood that this is exemplary only and that various other forms of sound attenuating devices may likewise incorporate the features of the present invention. Although not necessary for understanding the operation or best mode of the invention, reference may be had to U.S. Pat. No. 4,368,799, issued to Wagner, which discloses a prior art straight-through flow muffler similar to, but not incorporating, the features of this invention. With this disclosure available, the operation of the prior art can be more fully understood.

Turning to the embodiment in FIG. 1, there is shown generally a muffler 10 having a cylindrical housing 12 with end pieces 14 and 16. At the inlet end of the muffler 10, there is mounted an intake tube 18 which is secured within the housing 12 by endpiece 14 and an intermediate support 20. Tube 18 may have various portions which are perforated, such as at 22.

Proximate the end of the intake tube 18 is an integral fluted tube 30 having an inlet end 32 and an outlet end 34. The tube is supported at its outlet end by endpiece 16, as well as by intermediate support 36. Various portions of the tube may be perforated, as shown by the perforated area 38.

Tube 30 may include a cylindrical portion 40 at the inlet end and a like cylindrical portion 42 toward the outlet end. Tube 30 also includes a constricted region which is characterized by a region of rapidly decreasing throat crossectional area 46, a point of greatest throat constriction 48, and a region of gradually increasing crossectional area 50 from the point of greatest constriction 48 toward the cylindrical portion 42. The terms "rapid" and "gradual" are relative terms with repect to each other.

Figure 2:
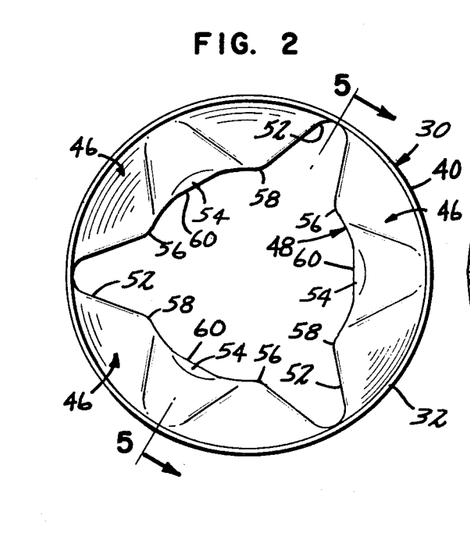
FIG. 2 is a cross-sectional view taken along lines 2—2 of FIG. 1.
Figure 3:
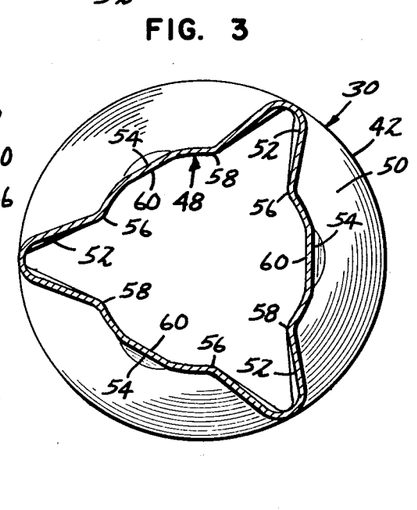
FIG. 3 is a cross-sectional view taken along lines 3—3 of FIG. 1.
Figure 4:
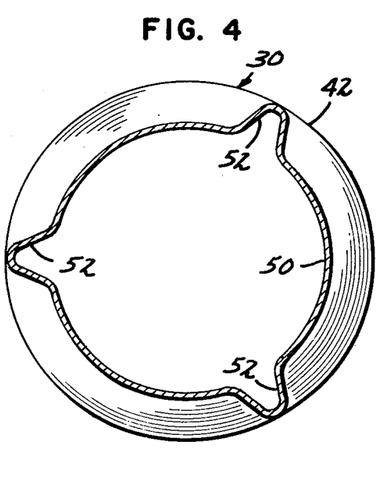
FIG. 4 is a cross-sectional view taken along lines 4—4 of FIG. 1.

FIGS. 2, 3 and 4 are cross-sectional views at various points along the length of the tube 30. FIG. 2 shows a view from the inlet end 42 where there can be seen the constricted portion 48 being discontinuous, the discontinuities being filled by flutes or troughs 52, which form bypass passages through the constricted portion within the tube. Between the troughs, there may be slight deformations in the rapidly decreasing diameter 46 shown by depressions 54. The troughs 52 and depressions 54 together form pairs of apexes 56 and 58 which demark the points of greatest constriction, i.e. where the apex is closest to the central axes of the tube. FIG. 3 is taken at the point of greatest constriction, and it can be seen that depressions 54 reach a plateau 60 at their point of greatest constriction.

FIG. 4 is taken in the region 50 which gradually increases in diameter toward the maximum diameter of the tube. In that view, only troughs 52 can be seen.

With respect to relative size, the gradually increasing region 50 is preferably two times longer than the rapidly increasing region 46.

Figures 5, 6, 7, 8, 9:
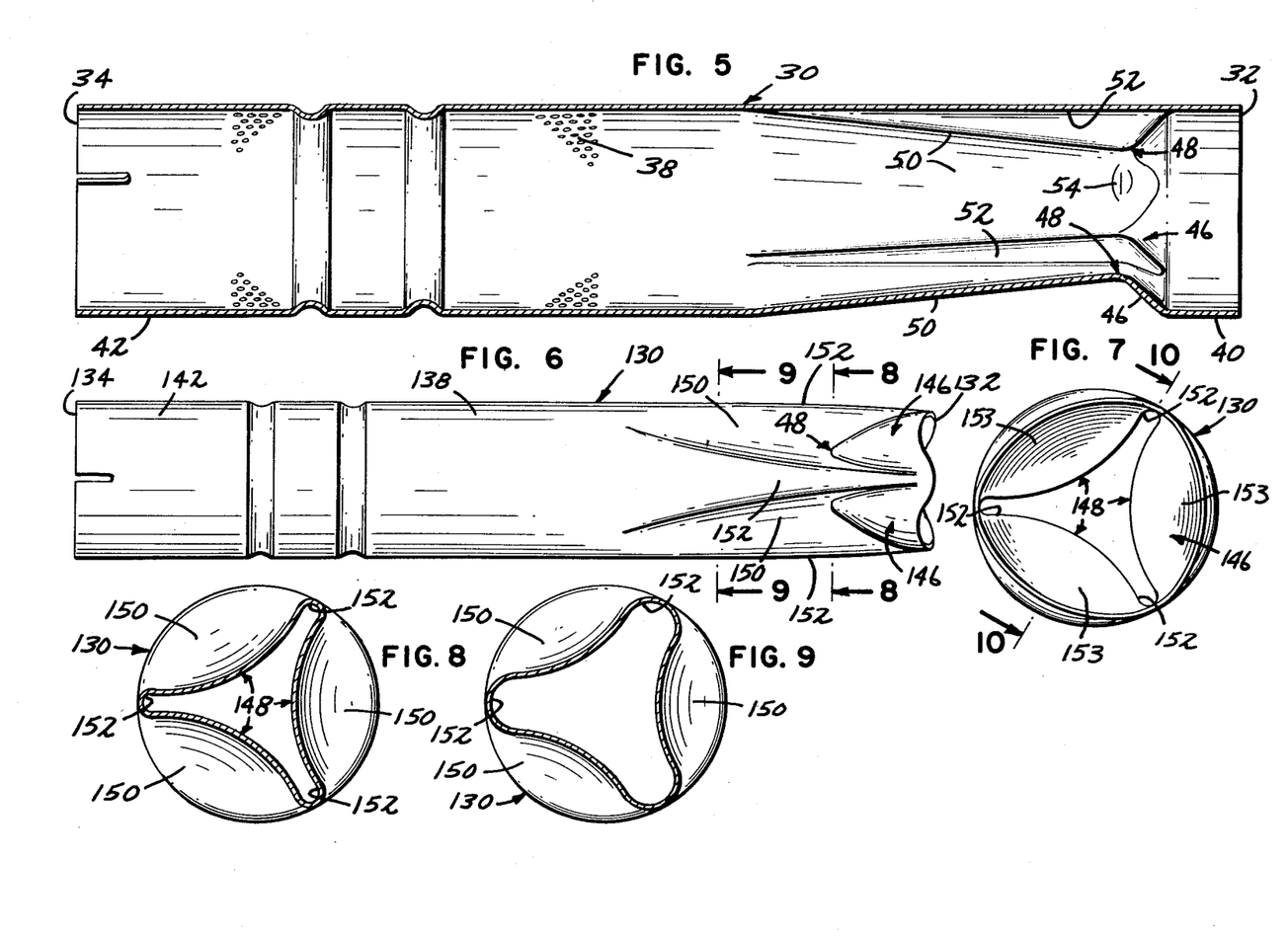
FIG. 5 is a view taken along lines 5—5 of FIG. 2.
FIG. 6 is an elevational view of an alternate embodiment of an integral fluted tube according to the present invention.
FIG. 7 is an inlet end view as seen from the right end of the tube in FIG. 6.
FIG. 8 is a cross-sectional view taken along lines 8—8 of FIG. 6.
FIG. 9 is a cross-sectional view taken along lines 9—9 of FIG. 6.

FIG. 5 shows the integral fluted tube 30 apart from muffler 10.

FIGS. 6–9 disclose an alternate embodiment of the integral fluted tube designated generally by the numeral 130. Like tube 30 in the previous embodiment, this tube can be described generally as having at least three regions, as viewed from the inside; a region of rapidly decreasing throat crosssectional area 146, a region of maximum constriction 148, and a region of gradually increasing throat crossectional area 150. Although it is not shown, tube 130 may also include a cylindrical portion corresponding to portion 40 in the previous embodiment.

FIG. 7 shows a view down the throat of the tube 130 where there can be seen a plurality of preferably concave, or sculptured, sidewalls 153 made discontinuous from each other by flutes or troughs 152 which extend from a point at which the throat of the tube begins to converge to a point where the throat is fully open in region 150. Sidewalls or depressions 153 would together form a generally conical shape if they were continuous. It can be seen in FIGS. 6–9 that the trough is very narrow and gradually increases toward the outlet end.

Figure 10:
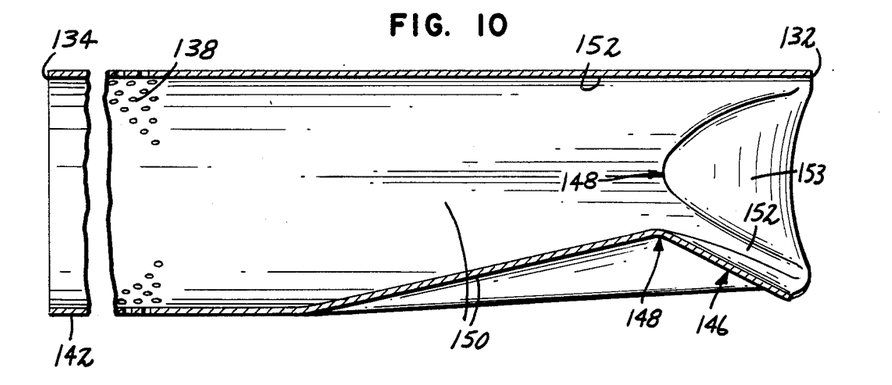
FIG. 10 is a sectional veiw of FIG. 7 taken along lines 10—10.

FIG. 10 shows a view as taken from FIG. 7 along lines 10—10, and more clearly illustrates the shape of depression 153, trough 152 and the exterior shape of the tube.

Figure 11:
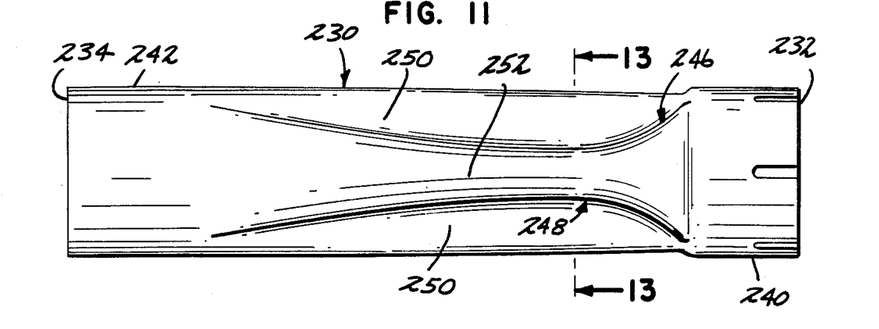
FIG. 11 is an elevational view of another alternate embodiment of an integral fluted tube in accordance with the present invention.
Figure 12:
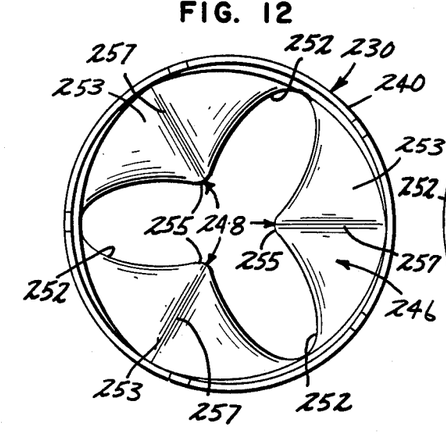
FIG. 12 is an inlet view as seen from the right end of the tube in FIG. 11.
Figure 13:
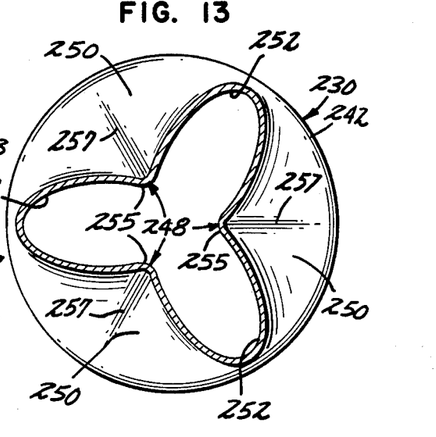
FIG. 13 is a view in cross-section taken along lines 13—13 of FIG. 11.

A third embodiment of the integral fluted tube is shown in FIGS. 11–13. Like the previous two embodiments, tube 230 has three regions of varying throat constriction as seen from the inside of the tube. Region 246 exhibits the most rapid decrease in throat crossectional area, and begins toward the inlet end 232. Region 248 is the area of maximum throat constriction and region 250 is a gradually increasing throat crossectional area which extends toward the outlet end 234. As can be seen from FIG. 12, which is an end view looking into the inlet end 232, the rapidly decreasing throat region 246 is formed by the plurality of inwardly formed sidewalls or depressions 253 which form ridges 257, which reach an apex 255 at the point of maximum constriction 248. From the apices 255, the inner surface of the tube falls away from the central axis in all directions. In the direction which enters region 246, the decline is preferably rapid as compared with that in region 250 where it is much more gradual.

Between the ridges 257 are formed a plurality of troughs 252 (of equal dimension in this case but not necessarily required to be so) which extend through the length of the tube to the inlet and outlet ends, 232, 234 respectively, where they are no longer distinguishable.

FIGS. 14-17 illustrate alternate embodiments of the present invention, including the integral fluted tube 330a and 330b. The system shown in FIG. 14, and generally indicated by the numeral 310, includes a muffler of known art 311 and one or both of integral fluted tubes 330a or 330b. Both tubes are shown as having four troughs 352, as opposed to the three troughs shown in the previous embodiments, to illustrate that alternative shapes are possible and that the invention is not limited to three or four troughs, but may include a range from one to a large number of troughs limited only by the ability to form the material into that shape from the original circumference of the tube (thus the "integral shape"). Thus, the embodiments shown in earlier figures may be replaced for those shown here as 330a and 330b. Furthermore, the distinction between 330a and 330b is only that 330b includes a plurality of perforations 370 and packing 372. Otherwise, they are considered identical.

Figure 14:
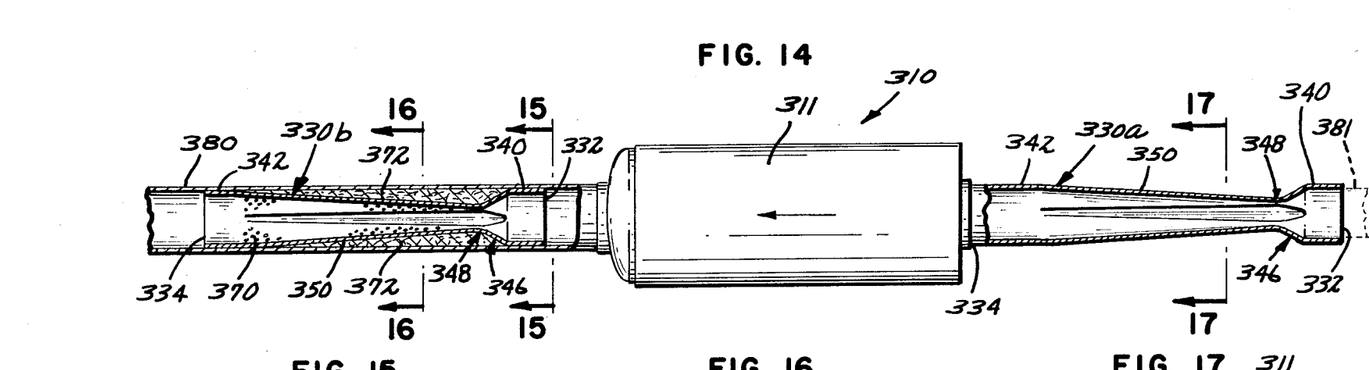
FIG. 14 is an elevational view of a further alternate embodiment of the present invention shown in place with a standard muffler and with portions broken away to more clearly show the integral fluted tube.
Figure 15:
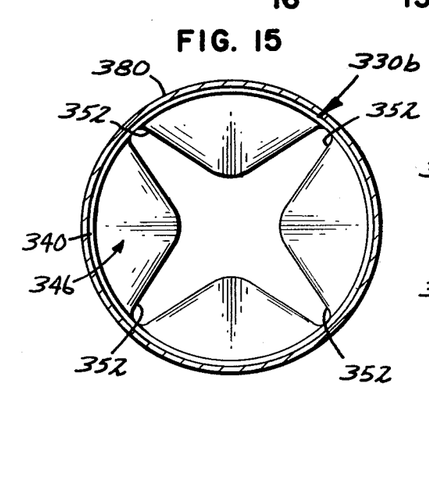
FIG. 15 is a cross-sectional view taken along lines 15—15 of FIG. 14.
Figure 16:
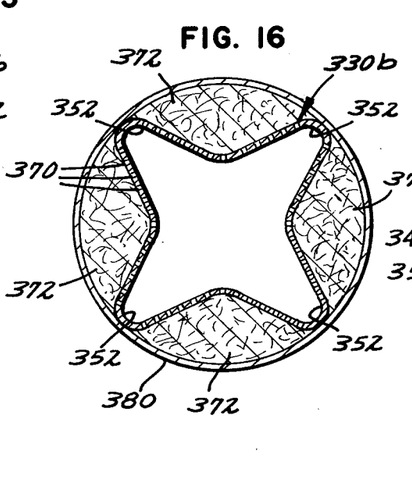
FIG. 16 is a cross-sectional view taken along lines 15—15 of FIG. 14.
Figure 17:
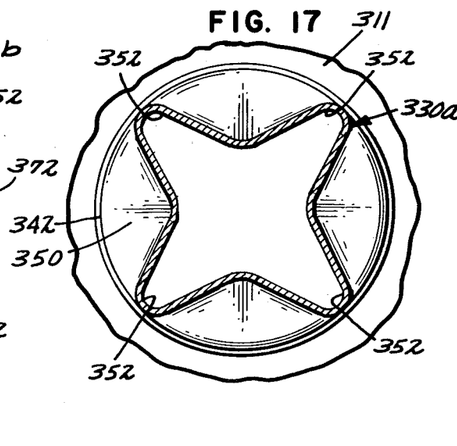
FIG. 17 is a cross-sectional view taken along lines 16—16 of FIG. 14.

Tube 330b is used in this embodiment as a sonic choke within an exhaust pipe 380 while tube 330a may be formed as a sonic choke integrally in an inlet exhaust pipe 381 or interposed inline between such pipe and the muffler 311 as shown. The tubes may be welded in place by spot weld techniques or by other fastening means. Tubes 330a and 330b are otherwise considered generally similar to the embodiment shown in FIG. 13, except that there are four troughs 352 corresponding to troughs 252 in the previous embodiments.

The construction of the integral fluted tube is extremely simple and lends itself well to modification for a different throat constriction, overall diameters and length, so that a multitude of mufflers can be made from the same apparatus. The tube may be formed by pinching together, without touching, the outer periphery of the tubular member at a plurality of locations around its outer circumference at some point between its ends to create a circumferentially discontinuous throat constriction inside the tube and troughs at the point where the tubular member is pinched. The tube may also be formed by impressing pairs of indentations into the sidewalls of a tubular member at a point between its ends to create a circumferentially discontinuous throat constriction in the member with troughs formed between the indentations. The indentations may also be varied across the length of the members so that they rise to a peak, and then more gradually recede toward the other end of the tube. With respect to machine manufacture, the tube may be made by pushing the walls of the tube with a tool which gradually reforms (in dents) the tube to the new shape. The depth and width of the trough can easily be controlled by adjustment of the simple forming dies. The resulting structure is a tube whose periphery is radially asymmetrical. It can be appreciated that the tube can be made to an unlimited number of throat constrictions and degree of frontal and rear shape from the constriction by merely adjusting to degree of indentation. No new dies or tools would be required.

The operation of the invention can be described for use in sound suppression devices by making reference to FIG. 1. In that figure, muffler 10 is based on a "straight-through" muffler package known in the art. Numerous variations on that structure are shown in U.S. Pat. Nos. 4,368,799, and 3,672,464. However, it should be understood that this invention is not limited to use in these configurations, but can be applied to a multitude of other muffler arrangements, such as, for example, the structures shown in U.S. Pat. Nos. 4,267,899; 3,419,892; and ejector mufflers, such as, for example, U.S. Pat. No. 4,325,460.

Turning to FIG. 1, exhaust gases enter intake tube 18 and pass generally through the tube until they reach the end of the tube. These gases then enter the inlet end of tube 30 because there is not alternative flow path. The constricted throat of tube 30 produces sound reduction in the same manner as is known in the prior art for sonic chokes or venturis. A portion of the gas flow escapes passage through the constriction and instead flows through the bypass trough 52. The effect is to increase silencing and reduce backpressure through the tube. This is apparently caused by the interaction of the two flow patterns, one coming through the constricted portion and the other passing unimpeded through the trough.

The sound attenuating operation of the embodiments shown in the remaining figures is the same.

In FIG. 14, there is shown an alternative placement for the integral fluted tubes 330a and 330b, either before or after a standard muffler, in line with an exhaust tube. The tube may have perforations and packing, or may be without those features, and may be formed separately from or integrally with exhaust pipes 380, 381.

Test studies on prototypes of the integral formed tubes operated optimally show that a lower pressure drop and higher maximum velocity can be achieved over a similarly sized, radially symmetrical choke. The preferred number of troughs appears to be three, with four troughs being substantially less advantageous. It is also desirable to produce the tubes from a seamless tubular material, or at least locate the weld seam at or near a trough. The significance of weld seams in this invention is substantially reduced over the prior systems with symmetrical chokes. In the prior systems, the chokes were made from a die stamped bell-shaped nozzle and a welded seam conical section. Joining these parts at the constricted throat location caused undesired turbulence. The chokes could also be made from two identical halves being welded together at midpoints, creating two weld seams. These seams appeared to create flow discontinuities and resulted in undesirable turbulence. Since the present invention does not rely on the symmetry of tube in the same manner as in the prior art, the seams do not create the difficulties inherent in these prior devices.

Of course, aside from the operational advantages of the present invention, we consider it to be most significant that the present invention can be used to replace existing conical venturis and produce at least equal performance at a substantially reduced production cost. This advantage is achieved by the fact that conical venturis must be made from dies, and even small changes in their size raises production costs considerably. The present invention can be formed to a multitude of dimensions and constrictions with the same tools, making customization quite inexpensive.

Turning to the use of the invention as an exhaust ejector alone or in conjunction with a muffler, attention should be directed to FIGS. 18-28. To the extent that the description of parts does not change in this use of the invention, the description will not be repeated and the explanation of the various numerals will be found in the preceding section.

Figures 18, 19:
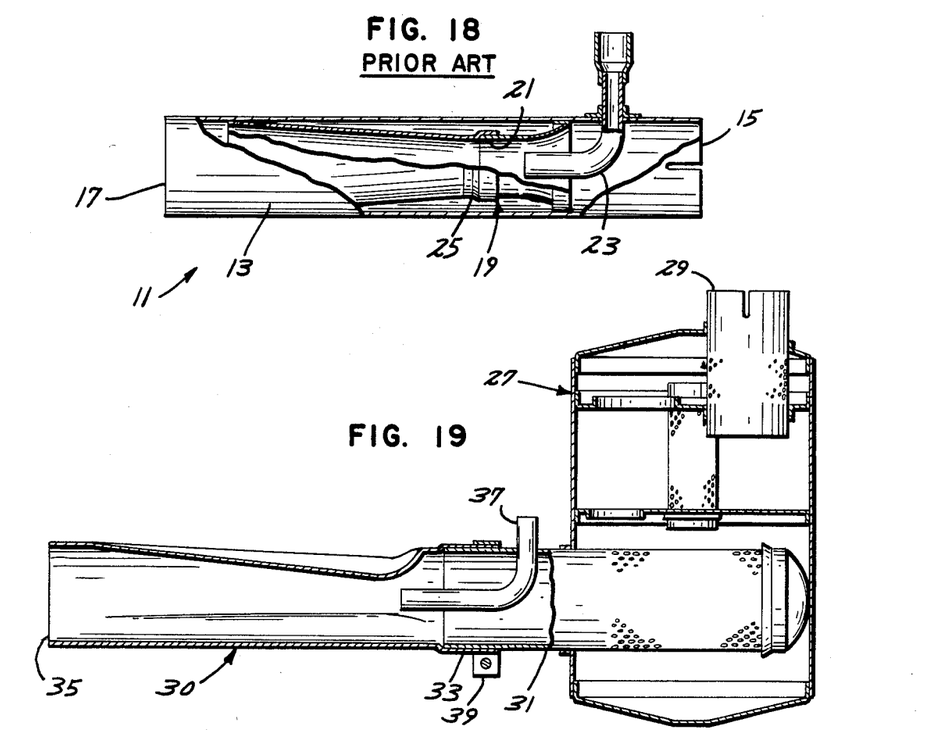
FIG. 18 is an elevational view of a prior art device showing the state of the art portions thereof being broken away and shown in section.
FIG. 19 is an axial sectional view showing a preferred embodiment of the ejector of the present invention as used as an add-on to a muffler.

An understanding of the present invention in this environment will be facilitated by a brief consideration of a prior art structure shown in FIG. 18, illustrating an ejector which may be used independently of the presence or absence of a muffler. The ejector designated generally by the numeral 11 has a cylindrical housing 13, a first end 15 at which exhaust gases are to be received, and a second end 17 from which they are to be discharged. A concial venturi 19 concentric with housing 13 is mounted therein and has a throat 21. A scavenge tube 23 is inserted through the housing 13, and is formed to be positioned along the central axis of the venturi toward the region of maximum constriction 25. In operation, exhaust gases enter at 15 and exit out of 17 under pressure of the engine supplying the gases. A vacuum is created near the maximum constriction on the inlet inside which draws the dirty air out of the scavenge tube from the air cleaner and ejects it through the venturi to the second end thereof. The scavenge tube is thereby effectively evacuated and the particulate matter is expelled from the system.

Turning now to FIG. 19, is shown and embodiment of the present invention as used as an add-on to a muffler. It should be understood that the purpose of FIG. 19 is for understanding of a typical environment, and the invention should not be limited thereby. In FIG. 19, a muffler 27 having an inlet 29 and outlet 31 provides a source of pressurized gases for the inlet 33 and outlet 35 of the integral fluted tube ejector 30 which has a scavenge tube 37 located in the throat thereof in a manner similar to that shown in FIG. 18 subjected to detailed explanation below. The muffler 27 and ejector tube 30 are joined by clamp 39 in an air-tight relationship.

Figure 20:
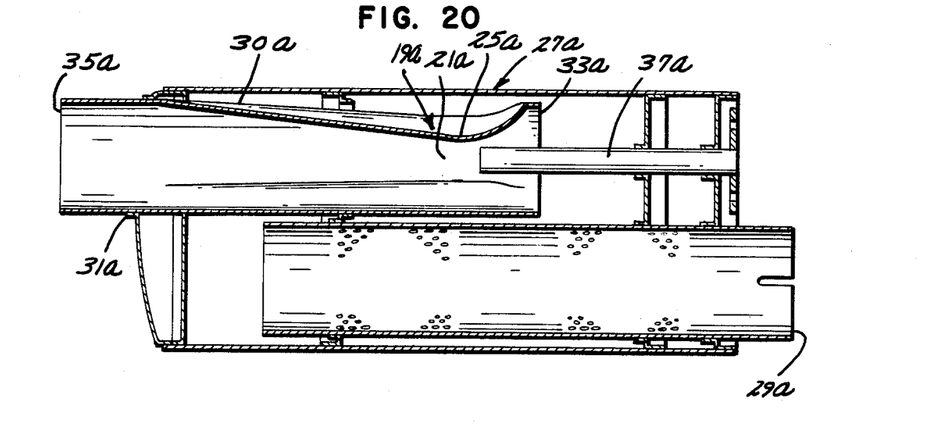
FIG. 20 is an axial sectional view showing the ejector of the present invention located within the housing of a muffler.
Figures 21, 22, 23, 24:
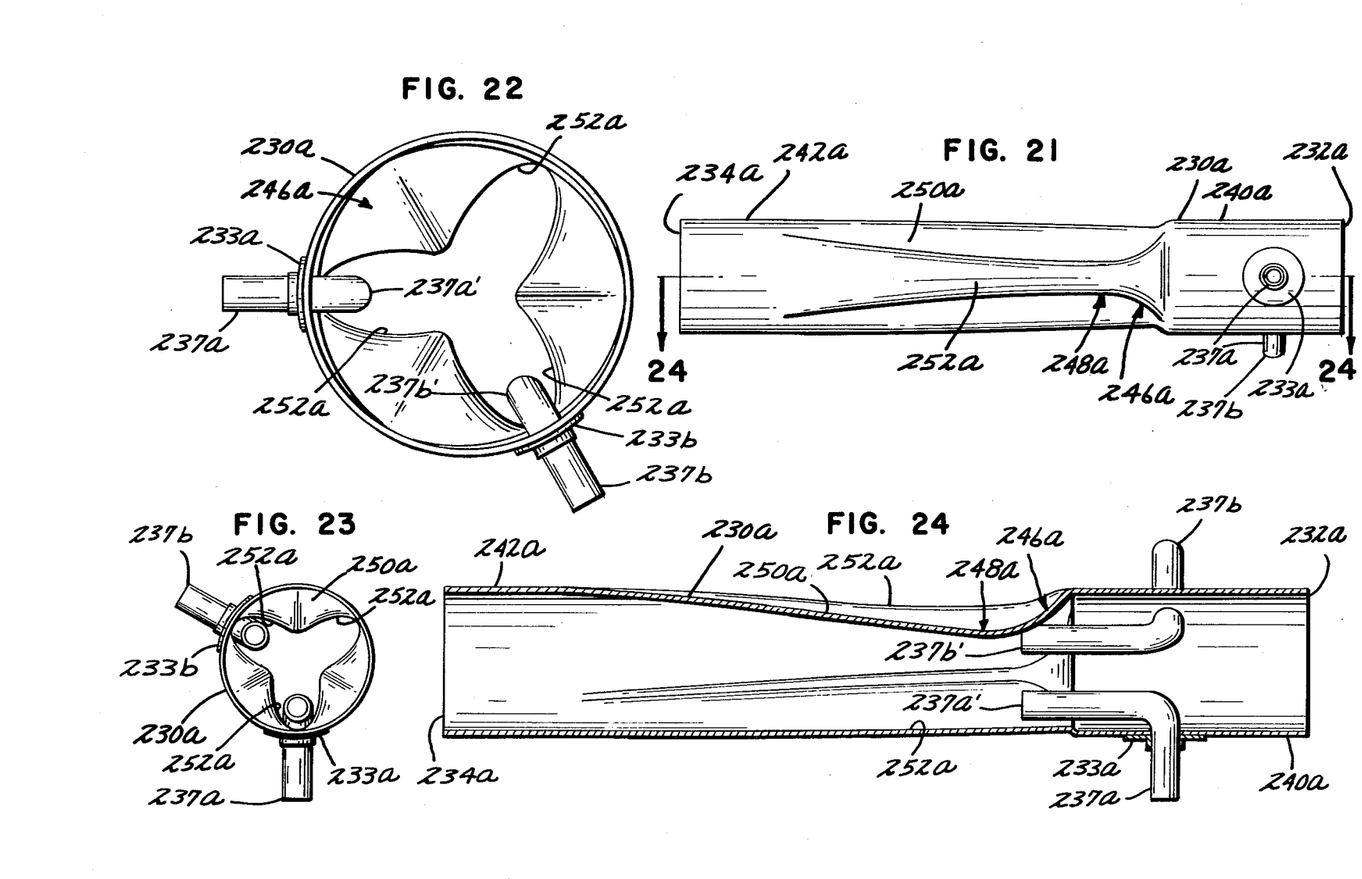
FIG. 21 is an embodiment of an ejector in an elevational view of the present invention employing two scavenge tubes.
FIG. 22 is an enlarged right end view of FIG. 21.
FIG. 23 is a left end view of FIG. 21 rotated 90 degrees.
FIG. 24 is an axial sectional view as seen from the lines 24—24 of FIG. 21 on a slightly enlarged scale.

FIG. 20 illustrates a typical ejector-muffler combination where the ejector is located within the housing of the muffler. Like parts relating to those in FIG. 19 are pointed out with similar numerals having an additional small "a" following the numeral. Unlike the add-on ejector in FIG. 19, the integral tube 30a is located within housing 27a and scavenge tube 37a also passes therethrough.

Turning to FIGS. 21-24, there can be seen integral tube 230a and associated elements in this embodiment, in greater detail.

FIGS. 21-24 more clearly show the location of scavenge tubes 237a and 237b. In this embodiment, the scavenge tubes enter through apertures in the sidewall of the tube 230a and may be reinforced by plates 233a and 233b. The scavenge tubes include a portion 237a' and 237b' which extends into the troughs 252a. Although the scavenge tubes 237a, 237b are shown inserted within the trough 252a nearest their entrance through the sidewall of tube 230a, it is possible for the scavenge tubes 237a and 237b to extend across the inlet 232a of tube 230a into a distant trough 252a, rather than the most adjacent one, if manufacturing constraints require. It is also possible to locate one tube on the central axis (throat) and in fact, this is the preferred configuration, see FIG. 19.

Figure 25:
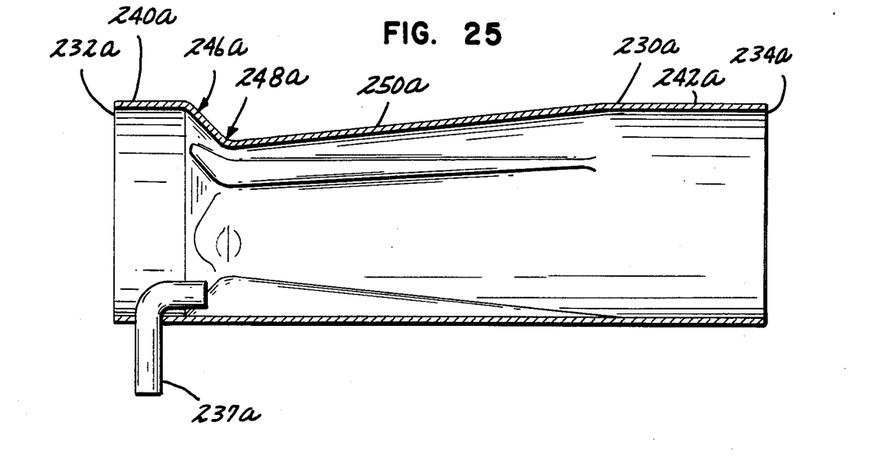
FIG. 25 is an axial sectional view of an alternate embodiment.

An alternate embodiment of the invention, as applied to exhaust ejector, is shown in FIG. 25. The complete description of the integral formed tube can be found in an earlier portion of the detailed description relating to sound suppression.

Again, as in the previous embodiment of the exhaust ejector, a scavenge tube 237a enters the sidewall of the tube 230a and extends into the throat thereof. In this embodiment, we have shown only one scavenge tube. However, it be may be understood that any number of scavenge tubes may be used, limited only by the number of troughs (plus the central axis) provided in the particular embodiment of the integral formed tube. The additional scavenge tubes may be connected to other air cleaners, crankcase breather systems or other aspiration needs.

Figure 26:
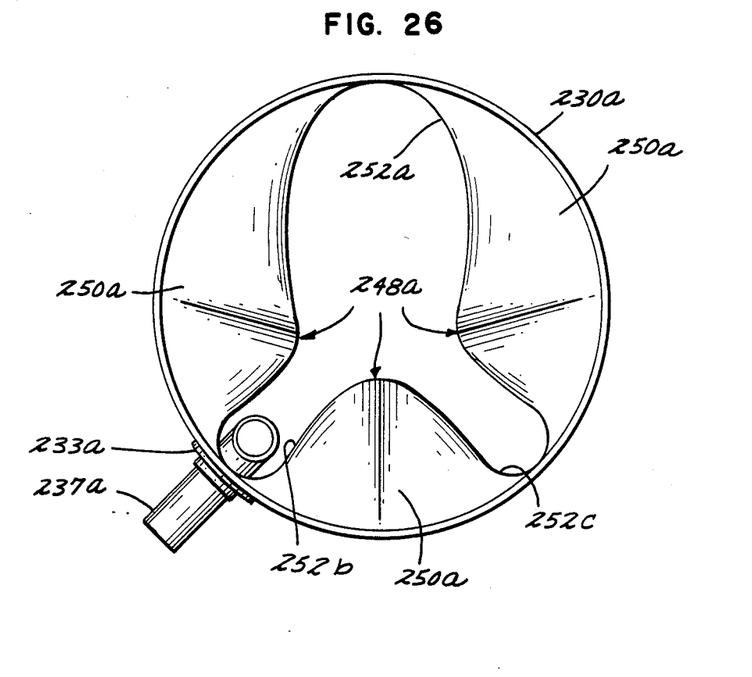
FIG. 26 is an outlet end view of a further alternate embodiment.

FIG. 26 discloses an alternate embodiment based on the shape shown in FIGS. 11-13 and 20-23, except that the troughs 252a, b and c, are of different sizes and asymmetrical and are not centered on the central axis of the tube 230a. Although FIG. 26 is taken as a cross-section at the point of greatest constriction, the remaining structure can easily be extrapolated from the above-mentioned views, noting the differences therein.

Unlike previous conical venturis used as exhaust ejectors, we have found that the location of the scavenge tube within the venturi throat can be used to greater advantage than that known in the prior art. Generally speaking, the scavenge tube should be located further upstream than as previously been the case with prior art devices. With such a location, the backpressure is reduced to a greater degree than the vacuum and, by reducing the cross-sectional area of the throat to regain vacuum, this configuration can exceed the performance of the conical designs in the prior art. The result is lower backpressure for the same scavenge flow. The location of peak performance is much more pronounced than in prior devices.

Figure 27:
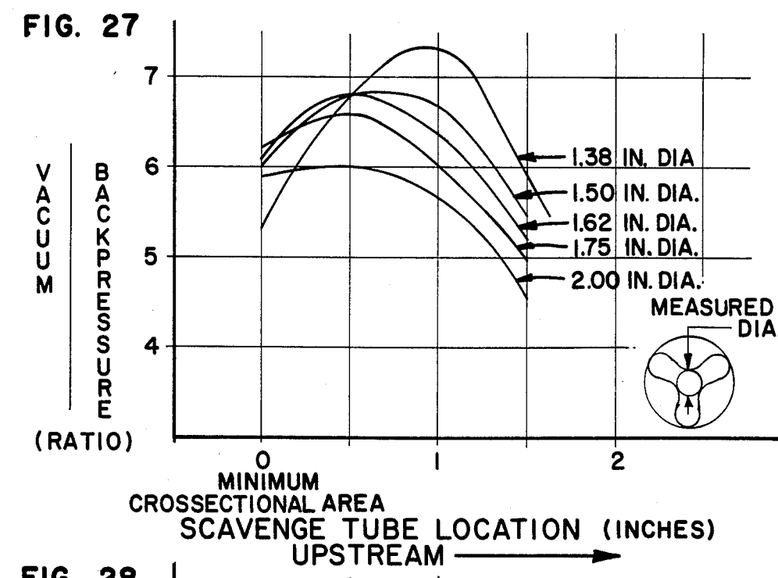
FIG. 27 is a trace of scavenge tube location within a throat.
Figure 28:
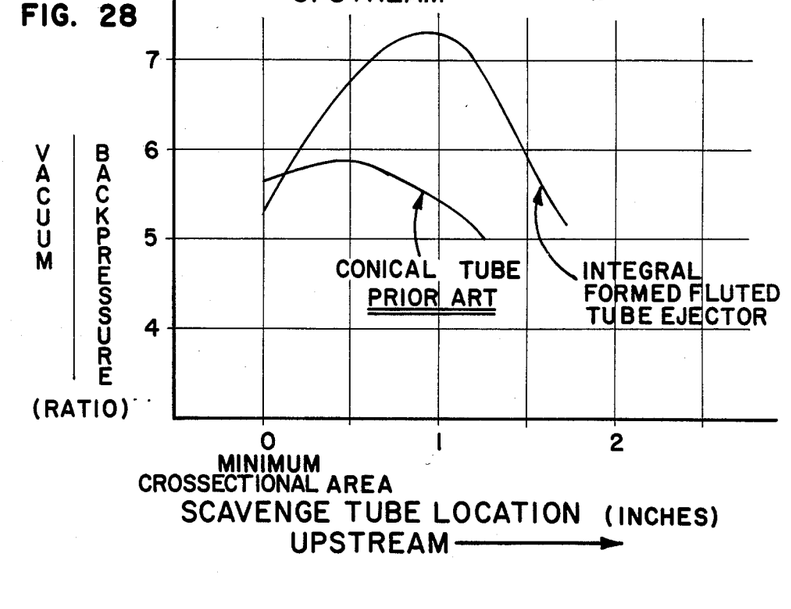
FIG. 28 is a trace of optimum location of scavenge tubes within the throat of circular and integrally formed tube structures.

FIG. 27 is a trace of scavenge tube location within the throat vs. vacuum/backpressure ratio for various throat crossectional areas. The trace shows the scavenge vacuum divided by added backpressure as a function of scavenge tube longitudinal location. It is noted that the integral tube ejector of the present invention produces an optimum performance, which peaks when the tube is located slightly upstream of the minimum throat area. The optimization can be seen in FIG. 28, where it can also be seen that the vacuum/backpressure is substantially enhanced in the peak region over the conical design. In the prior art, the scavenge tube was located into and perhaps a few millimeters beyond the minimum constriction. In our embodiment, we locate the scavenge upstream of the minimum constriction to achieve optimum performance (distance depending on throat crossectional area). In addition to these advantages, it is apparent that the present invention has the additional advantage that several scavenge tubes may be employed in one integral tube, the limiting factor being primarily the number of troughs (plus one centrally located) available in that particular embodiment. There is no practical way to provide several scavenge tubes in the prior circular venturi.

Numerous characteristics and advantages of the invention have been set forth in the foregoing description, together with the details of the structure and function of the invention. The novel features thereof are pointed out in the appended claims. The disclosure, however, is illustrative only, and changes may be made in detail, especially in matters of shape, size and arrangement of parts, within the principle of the invention, to the full extent indicated by the broad general meaning of the terms in which the appended claims are expressed.

What is claimed is:

1. A sound suppression device having a housing with an inlet and outlet, and a single integral tubular member in gaseous connection with said inlet and outlet, said tubular members having first and second ends and a constricted portion forming a throat portion therebetween, said portion being circumferentially discontinuous and having a noncircular periphery and at least one fluted passage within said throat portion located at a discontinuity which extends through said constriction, thereby permitting a portion of the gas flow to circumvent said constriction.

2. A device according to claim 1 wherein said constriction begins proximate said first end and progressively diminishes toward said second end.

3. A device according to claim 2 wherein said throat portion has a cross-sectional area which decreases to a minimum area and then increases more gradually to the maximum area of the tube at the second end thereof.

4. A device according to claim 2 wherein said constricted portion and said discontinuity form at least one trough bounded by sloping walls extending toward apexes at the constricted portion.

5. A device according to claim 3 wherein said constricted portion includes a frontal portion as seen from its first end which rises to an apex toward the central axis of the tubular member and a rear portion sloping away from the apex toward the outlet and more gradually than the frontal portion.

6. A device according to claim 1 wherein said at least one passage froms troughs extending between the ends of the tubular member residing between said constricted portion, said constricted portion having a frontal portion of generally concave portions as seen from the inside inlet end of the tube and rising to an apex and thereafter forming a plurality of convex rear portions sloping away from the apexes toward the outlet end.

7. A device according to claim 3 wherein said at least one passage is a trough which extends between the ends of the tubular member and becomes progressively shallower toward the second end thereof.

8. A device according to claim 3 wherein said at least one passage includes three troughs spaced around the inner periphery of the tubular member.

9. A muffler for use with an engine, said muffler having a housing with an inlet and outlet, and a single integral tubular member in gaseous connection with said inlet and outlet, said tubular member having first and second ends and a constricted portion forming a throat portion therebetween, said portion being circumferentially discontinuous and having a noncircular periphery and at least one fluted passage within said throat portion located at a discontinuity which extends through said constriction, thereby permitting a portion of the gas flow to circumvent said constriction.

10. A device according to claim 9 wherein said constricted portion begins proximate said first end and progressively diminishes toward said second end.

11. A device according to claim 10 wherein said constricted portion has a cross-sectional area which decreases to a minimum area and then increases more gradually to the maximum area of the tube at the second end thereof.

12. A device according to claim 11 wherein said constricted portion and said discontinuity form at least one trough bounded by sloping walls extending toward apexes at the constricted portion.

13. A device according to claim 11 wherein said constricted portion includes a frontal portion as seen from its first end which rises to an apex and a rear portion sloping away from the apex toward the outlet end more gradually than the frontal portion.

14. A device according to claim 11 wherein said at least one passage is a trough which extends between the ends of the tubular member and becomes progressively shallower toward the second end thereof.

15. A device according to claim 11 wherein said at least one passage includes three troughs spaced around the inner periphery of the tubular member.

16. In an exhaust ejector system having a tubular member including a venturi therein, a scavenge tube of lesser diameter than said tubular member inserted into said member proximate said venturi for drawing air out of said scavenge tube and through said venturi by virtue of a low pressure condition present in the venturi, the improvement comprising said tubular member being a single integral tubular member having an inlet and outlet, said member having first and second ends and a constricted portion forming a throat portion therebetween, said portion being circumferentially discontinuous and having a noncircular periphery and at least one fluted passage within said throat portion located at a discontinuity which extends through said constriction, thereby permitting a portion of the gas flow to circumvent said constriction.

17. A device according to claim 16 wherein said constricted portion begins proximate said first end and progressively diminishes toward said second end.

18. A device according to claim 17 wherein said constricted portion has a cross-sectional area which decreases to a minimum area and then increases more gradually to the maximum area of the tubular member at the second end thereof.

19. A device according to claim 18 wherein said constricted portion and said discontinuity form at least one trough bounded by sloping walls extending toward apexes at the constricted portion.

20. A device according to claim 18 wherein said constricted portion includes a frontal portion as seen from its first end which rises to an apex and a rear portion sloping away from the apex toward the outlet and more gradually than the frontal portion.

21. A device according to claim 18 wherein said at least one passage is a trough which extends between the ends of the tubular member and becomes progressively shallower toward the second end thereof.

22. A device according to claim 18 wherein said at least one passage includes three troughs spaced around the inner periphery of the tubular member.

23. An exhaust ejector according to claim 16 wherein said at least one bypass passage includes three troughs extending though said constricted portion, and wherein said troughs are of unequal size.

24. An exhaust ejector according to claim 23 wherein said three troughs are asymmetrically spaced around the inner periphery of said tubular member.

25. In an ejector muffler system for sound suppression and ejecting matter carried in a scavenge tube, including a muffler having a tubular member having a venturi therein and said scavenge tube of lesser diameter than said tubular member being inserted into said member proximate said venturi, for ejecting matter out of said scavenge tube by virtue of the low pressure condition present in the venture while it is operating as a sound suppressor, the improvement comprising: said tubular member being a single integral tubular member having an inlet and outlet, said tubular member having first and second ends and a constricted portion forming a throat portion there between, said portion being circumferentially discontinuous and having a noncircular periphery and at least one fluted passage within said throat portion located at a discontinuity which extends thru said constriction, thereby permitting a portion of the gas flow to circumvent said constriction.

* * * * *